US011292704B2

(12) United States Patent
Chapman et al.

(10) Patent No.: US 11,292,704 B2
(45) Date of Patent: Apr. 5, 2022

(54) POWERED MOBILE BASE FOR A CAMERA CRANE

(71) Applicant: CHAPMAN/LEONARD STUDIO EQUIPMENT, INC., North Hollywood, CA (US)

(72) Inventors: Leonard T. Chapman, North Hollywood, CA (US); Sarmen Mirzakhanian, North Hollywood, CA (US); David Gasparian, North Hollywood, CA (US)

(73) Assignee: CHAPMAN/LEONARD STUDIO EQUIPMENT, INC., North Hollywood, CA (US)

( * ) Notice: Subject to any disclaimer, the term of this patent is extended or adjusted under 35 U.S.C. 154(b) by 289 days.

(21) Appl. No.: 16/386,573

(22) Filed: Apr. 17, 2019

(65) Prior Publication Data
US 2019/0337785 A1    Nov. 7, 2019

Related U.S. Application Data

(60) Provisional application No. 62/667,489, filed on May 5, 2018.

(51) Int. Cl.
*B66F 11/04*     (2006.01)
*G05D 1/00*      (2006.01)
(Continued)

(52) U.S. Cl.
CPC ............ *B66F 11/048* (2013.01); *B62B 3/001* (2013.01); *B62B 3/02* (2013.01); *B62B 5/0046* (2013.01);
(Continued)

(58) Field of Classification Search
CPC ........ B66F 11/048; B66F 13/00; B62B 3/001; B62B 3/02; B62B 5/0046; B62B 5/06;
(Continued)

(56) References Cited

U.S. PATENT DOCUMENTS 4,633,666 A * 1/1987 Karakama ............. E02F 9/2239
                                                    60/421
4,699,484 A * 10/1987 Howell ................... F16M 11/10
                                                    352/132
(Continued)

OTHER PUBLICATIONS

CS Base, Crane & Remote Arm Base, Chapman/Leonard Studio Equipment, Inc. 2008-2010 Catalog, Jan. 1, 2008, pp. 92-93.

*Primary Examiner* — Nkeisha Smith
(74) *Attorney, Agent, or Firm* — Perkins Coie LLP; Kenneth H. Ohriner

(57) ABSTRACT

A camera crane mobile base for carrying a camera crane includes a first powered remotely controllable steering system having first and second axle assemblies at a first end of a chassis. A second steering system including third and fourth axle assemblies is provided at a second end of the chassis. A first electrically powered remotely controllable propulsion system includes an electric propulsion motor connected to first and second axles in the first and second axle assemblies. A telescoping center post is pivotally attached to the chassis. An on-board hydraulic system may power the first steering system and the telescoping center post.

15 Claims, 6 Drawing Sheets

(51) Int. Cl.
  *F16M 11/42* (2006.01)
  *B66F 13/00* (2006.01)
  *F16M 11/28* (2006.01)
  *B62B 3/00* (2006.01)
  *B62B 5/00* (2006.01)
  *B62B 5/06* (2006.01)
  *G03B 17/56* (2021.01)
  *B62B 3/02* (2006.01)
  *B60F 1/04* (2006.01)

(52) U.S. Cl.
  CPC ............. *B62B 5/06* (2013.01); *B66F 13/00* (2013.01); *F16M 11/28* (2013.01); *F16M 11/42* (2013.01); *G03B 17/561* (2013.01); *G05D 1/0011* (2013.01); *B60F 1/043* (2013.01); *B62B 2206/06* (2013.01); *F16M 2200/08* (2013.01)

(58) Field of Classification Search
  CPC .... B62B 2206/06; F16M 11/28; F16M 11/42; F16M 2200/08; G03B 17/561; G05D 1/0011; B60F 1/043
  USPC ................................ 248/125.1; 352/243, 244
  See application file for complete search history.

(56) References Cited

U.S. PATENT DOCUMENTS

| | | | |
|---|---|---|---|
| 5,312,121 A * | 5/1994 | Chapman | B66F 11/048 280/47.11 |
| 5,704,623 A | 1/1998 | Chapman | |
| 7,209,176 B2 | 4/2007 | Chapman | |
| 8,322,858 B2 * | 12/2012 | Chapman | F16M 11/42 352/243 |
| 8,550,632 B2 * | 10/2013 | Chapman | F16M 11/28 352/243 |
| 8,684,530 B2 | 4/2014 | Chapman | |
| 8,733,478 B2 * | 5/2014 | Chapman | F16M 11/28 180/24.07 |
| 9,638,986 B1 * | 5/2017 | Chapman | G03B 17/561 |
| 2017/0123296 A1 * | 5/2017 | Chapman | F16M 11/42 |
| 2019/0019408 A1 * | 1/2019 | Beaulieu | G08G 1/07 |
| 2019/0185182 A1 * | 6/2019 | Bei | F16M 11/2042 |

* cited by examiner

POWERED MOBILE BASE FOR A CAMERA CRANE

CROSS-REFERENCE TO RELATED APPLICATION(S)

This application claims priority to U.S. Provisional Patent Application No. 62/667,489 filed May 5, 2018, incorporated herein by reference.

BACKGROUND OF THE INVENTION

Camera cranes are used to position and maneuver motion picture cameras, such as motion picture film or digital cameras, HD cameras, and 2D and 3D cameras. Camera cranes typically have a crane arm mounted onto a mobile base or vehicle. The arm can be pivoted or tilted up or down, and panned from side to side, to obtain a desired camera position, while the mobile base remains stationary. Some crane arms can extend and retract with a telescoping movement. To follow a moving subject during filming, or to move the camera around a subject, move in, back-up or move diagonally in any direction, the motion base is pushed over the ground by the filming crew, or the motion base may be self-propelled via an on-board motor.

As filming often takes place on location outside of a studio, the mobile base is advantageously portable, so that, if necessary, it can be readily transported by truck to the filming location. Accordingly, the mobile base is advantageously compact. On the other hand, the mobile base should be able to provide a steady and rigid platform for supporting and moving a crane arm, and the ability to carry a heavy payload.

The development of remotely controlled cameras has allowed camera operators, cinematographers and directors a wider range of creative options for camera movements, positions and angles. With remote controlled cameras, since there is no camera operator behind the camera, the camera can be moved more quickly. The camera may also be moved into positions that would be unsafe for a camera operator, for example, suspended far out over a tall building. Larger and more versatile camera cranes have correspondingly been designed and built to better match the capabilities of remote control cameras. In turn, more versatile mobile bases are needed for these improved camera cranes. While various mobile camera crane bases having differing features and advantageous have successfully been used in the past, there remains a need for an improved mobile camera crane base which can carry larger crane arms while still being easily transported and maneuvered while in use.

SUMMARY OF THE INVENTION

In one aspect, a camera crane mobile base includes a first powered remotely controllable steering system having first and second axle assemblies at a first end of a chassis. A second steering system including third and fourth axle assemblies is provided at a second end of the chassis. A first electrically powered remotely controllable propulsion system includes an electric propulsion motor connected to first and second axles in the first and second axle assemblies. A telescoping center post is pivotally attached to the chassis. An on-board hydraulic system may power the first steering system and the telescoping center post. The second steering system may optionally also be powered by the on-board hydraulic system. The second steering system may also optionally include a second electrically powered remotely controllable propulsion system.

BRIEF DESCRIPTION OF THE DRAWINGS

In the drawings, the same reference number indicates the same element in each of the views.

DETAILED DESCRIPTION

U.S. Pat. Nos. 8,550,632 and 9,638,986, both incorporated herein by reference, describe mobile bases for a camera crane. As shown in FIGS. 1-5 an improved mobile base 10 has a powered remotely operable steering system at the first or front end of the chassis of the mobile base, for steering the front (first and second) wheels of the mobile base. The mobile base 10 also has a remotely operable motor drive system 20 at the front end for driving the front wheels. This allows a single person to operate the mobile base, typically via a joystick on a manual steering handle attached at the back of the mobile base.

Figure 6:
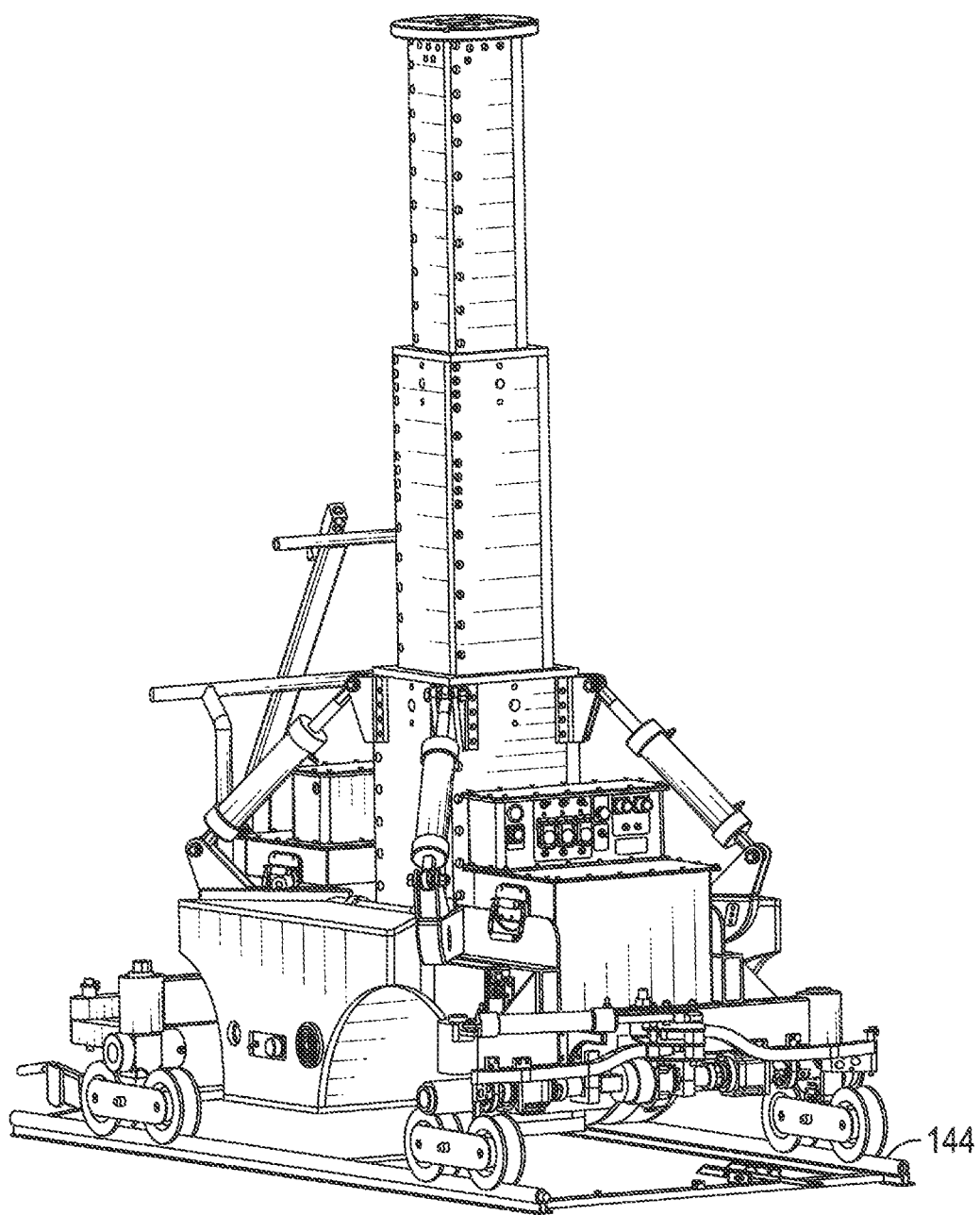
FIG. 6 is a perspective view of the mobile base on track with the ground tires removed.

In FIGS. 1-5, a mobile base 10 has front wheels rotatably attached onto axle couplings 142. The rear wheels and the rear steering system may be provided as described in U.S. Pat. Nos. 8,550,632 or 9,638,986. In the configuration shown, the mobile base has both ground wheels 18 and track wheels 101 installed. However, either set of wheels may or may not be used, depending on the filming sequence. FIG. 6 for example shows the mobile base on track 144 with the ground wheels removed.

In FIGS. 1-3 and 5 the powered remotely operable steering system includes a linear actuator 102 which may be a hydraulic cylinder. The piston end of the hydraulic cylinder is pivotally attached to the front steering compensator or transmission 24. The cylinder end of the hydraulic cylinder is attached at one side of the chassis 12. Details of the steering compensator 24 are described in U.S. Pat. No. 8,550,632 or 9,638,986.

The center post 112 can telescopically extend and retract to raise and lower a camera crane arm mounted on top of the center post. The center post may be driven either electrically or hydraulically, and is driven by a post hydraulic cylinder 131 in the embodiment shown. A hydraulic system 132 including a pump, a pump motor, an accumulator, and control valves, in contained within the chassis 12. The pump motor is powered via batteries in battery boxes 103, which may be lithium batteries.

Figure 2:
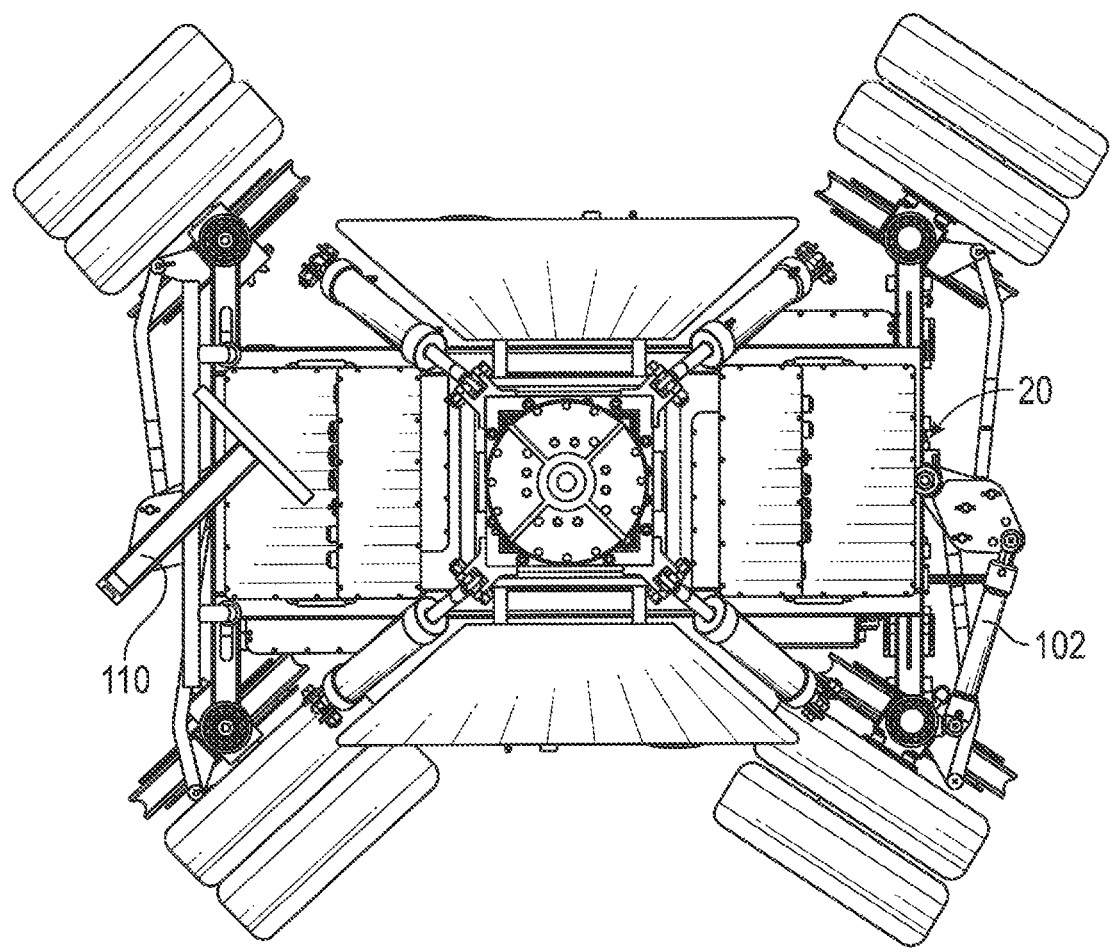
FIG. 2 is a top view of the mobile base shown in FIG. 1.

The motor drive system 20 includes an electric motor 130 linked to a gear reduction 133 which drives axle couplings 142 connected to the front wheels through universal joints 138, optionally also using secondary gear units 134. Brackets 136 hold the drive system 20 onto the front end of the chassis 12. The universal joints 138 allow torque to be supplied to the wheels via the motor 130, regardless of the steering angle of the kingpins 140, and hence the steering angle of the front wheels, as shown in FIG. 2.

Figure 4:
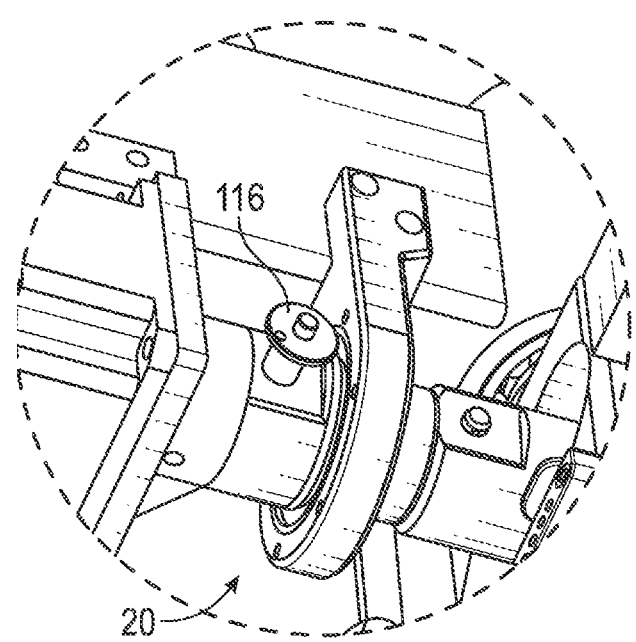
FIG. 4 is an enlarged detail view of a release pin as used on both sides of the motor drive system.
Figure 5:
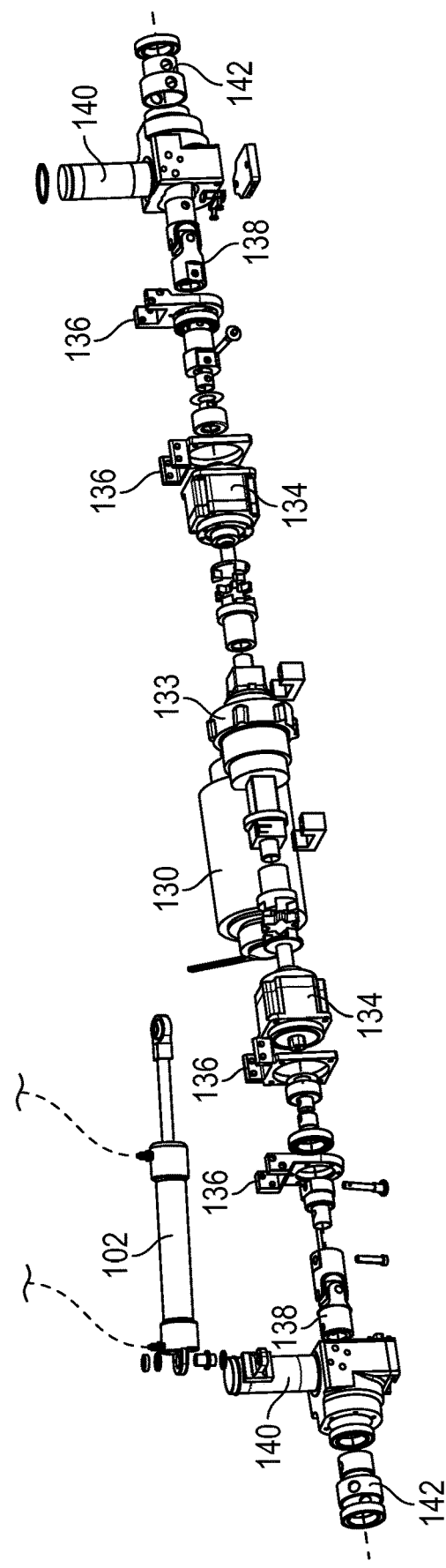
FIG. 5 is an exploded perspective view of the motor drive system shown in FIGS. 1, 3 and 4.

As shown in FIG. 4 release pins 116 may be provided in the motor drive system 20, optionally to the outside of the secondary gear units 134. Withdrawing or removing the release pins releases the wheel axles from the motor drive system 20. This allows the mobile base to be manually pushed, pulled or towed, without back driving the electric motor 130. Consequently the mobile base can be more easily moved when not using the motor drive system 20.

Figure 1:
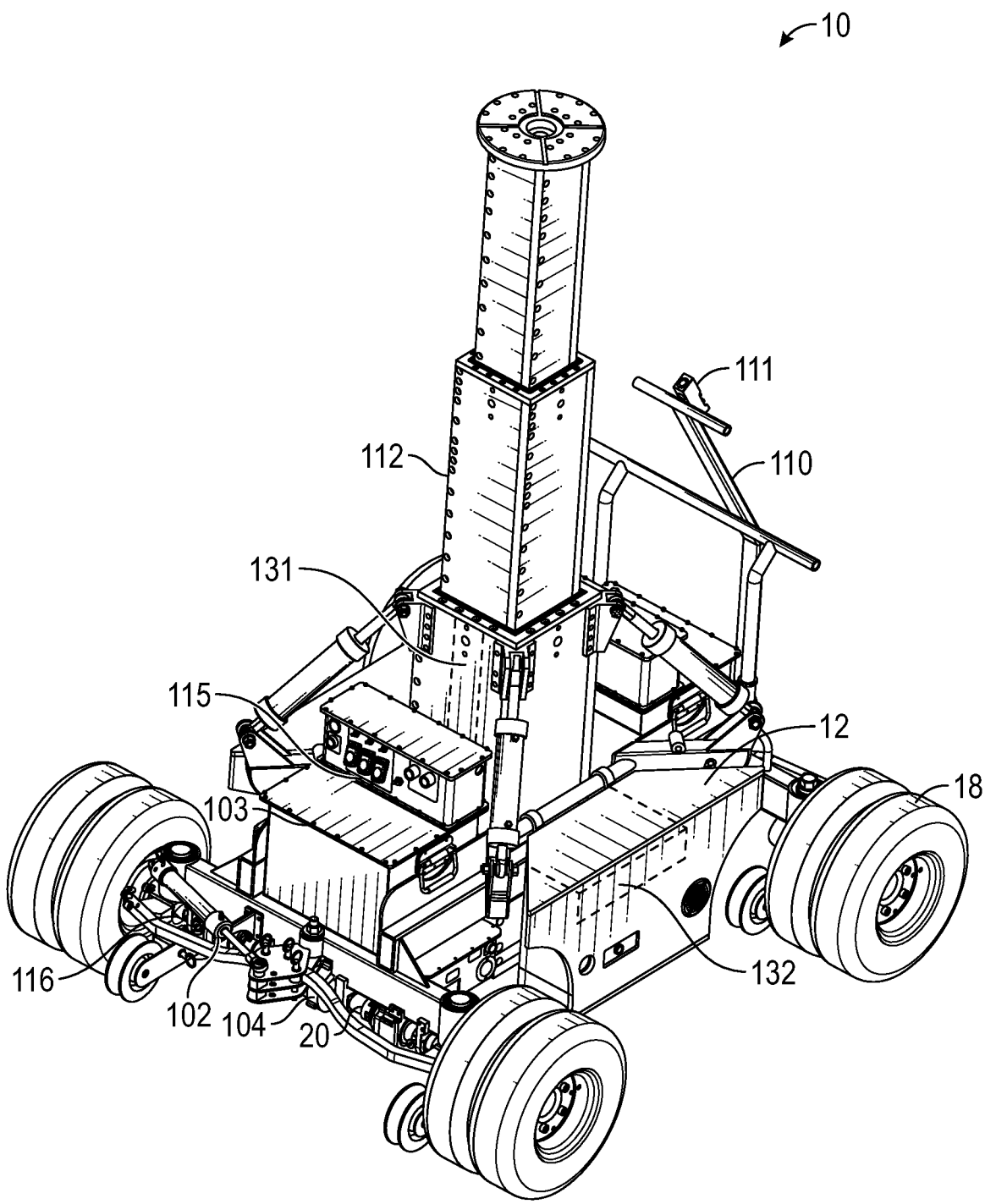
FIG. 1 is a top and front perspective view of a mobile base for supporting a camera crane.

As shown in FIG. 1, a joystick 111 or other hand controller may be permanently or temporarily attached to the manual or rear steering handle 110. The joystick 111 is electrically connected to the controller 115, via a cable or wirelessly. In a typically operating mode, the person operating the mobile base can manually steer the rear wheels, while also using the joystick 111 to both control the steering of the front wheels, and also control the driving speed and direction (forward or reverse) of the front wheels. This allows the mobile base to be operated by a single operator. The operator also does not need to push the mobile base since mobility is provided by the drive system.

The rear wheels may optionally be locked into the straight ahead position, and the steering and drive systems (as well as the center post) operated remotely via a wireless link from the operator to the controller 115. This allows the mobile base to maneuver in places that would be uncomfortable or dangerous for a human operator.

The center post can generally tilt +/−9 degrees in the front/back and left/right directions, to allow for levelling, by operation of the four levelling actuators 113 shown in FIG. 1. The amount of tilt is selected to keep the center of gravity of the load within the envelope of the wheelbase, to maintain stability.

Figure 3:
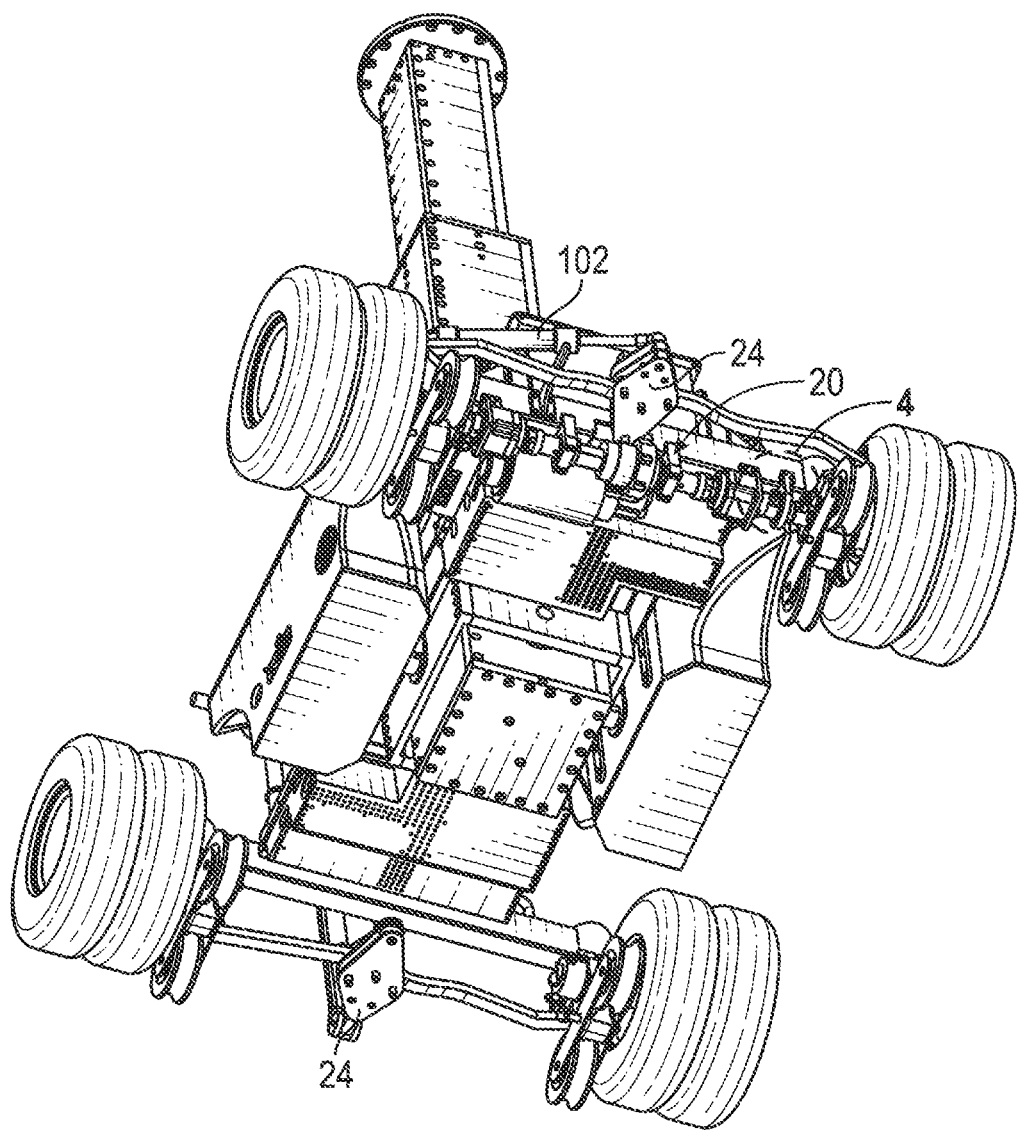
FIG. 3 is a bottom view of the mobile base shown in FIGS. 1 and 2.

Referring to FIGS. 1-3, the mobile base 10 may be largely symmetrical in the front to back direction. Either end may be considered as the front end, depending on user preference. Camera dollies are conventionally steered from the back. In this sense the end of the mobile base 10 to which the steering handle, if any, is attached may be considered to be the back end. The front and back ends may be switched by switching the position of the steering handle, if used. Although the drive system 20, and the powered steering system, are shown only on the front end in FIG. 3, a drive system 20 and/or a powered steering system, may also be provided on the opposite end or back end. In this case the mobile base 10 has the equivalent of four-wheel drive, and optionally front and rear steering. So-equipped, the mobile base 10 can better move over difficult terrain, with the operator remotely controlling both the steering angle and the torque exerted by front wheels and the back wheels, with the steering powered hydraulically and propulsion powered electrically. Either steering transmission 24 may be locked into a straight ahead position via a steering mode pin, allowing all steering to occur via only the front wheels or the back wheels.

FIG. 6 is a perspective view of the mobile base on track with the ground tires removed and track wheels installed. The track wheels are independent of, and not connected to, the steering and propulsion systems. When used on track the steering system is not used, as the steering angle of the track wheels is by the track. Similarly, when used on track, the propulsion system is not used, and the mobile based is typically pushed by hand. However, rolling resistance on track is greatly reduced relative to operation with the ground tires, which makes pushing the mobile base easier on track.

Thus, a novel mobile base has been shown and described. Various changes and substitutions may of course be made without departing from the spirit and scope of the invention. The invention, therefore, should not be limited, except by the following claims and their equivalents.

The invention claimed is:

1. A camera crane mobile base comprising:
   a chassis:
   a first hydraulically powered remotely controllable steering system including first and second axle assemblies at a first end of the chassis;
   a second hydraulically powered remotely controllable steering system including third and fourth axle assemblies at a second end of the chassis;
   first, second, third and fourth wheels rotatably attached onto first, second, third and fourth axles in the first, second, third and fourth axle assemblies, respectively;
   a first electrically powered remotely controllable propulsion system including a first electric propulsion motor connected to the first and second axles, respectively;
   a second electrically powered remotely controllable propulsion system including a second electric propulsion motor connected to the third and fourth axles, respectively;
   a telescoping center post pivotally attached to the chassis for supporting a camera crane; and
   the first and second electric propulsion motors connected to the first and second axles, respectively, through first and second gear reduction units.

2. The mobile base of claim 1 with the first powered remotely controllable steering system includes a steering compensator pivotally attached to the chassis, and a linear actuator having a first end pivotably attached to the steering compensator, and a second end attached to the chassis.

3. The mobile base of claim 2 wherein the linear actuator is a hydraulic actuator, further including a hydraulic power system including an electric pump motor driving a hydraulic pump to charge an accumulator, with the hydraulic power system connected to the hydraulic actuator.

4. The mobile base of claim 1 further including a first, second, third and fourth levelling actuators each having an upper end pivotally attached to the center post and each having a lower end pivotally attached, respectively, adjacent to first, second, third and fourth corners of the chassis.

5. A camera crane mobile base comprising:
   a chassis:
   a first powered remotely controllable steering system including first and second axle assemblies at a first end of the chassis, a steering compensator pivotally attached to the chassis, and a steering hydraulic actuator having a first end pivotably attached to the steering compensator, and a second end attached to the chassis;
   a second steering system including third and fourth axle assemblies at a second end of the chassis;
   first, second, third and fourth wheels rotatably attached onto the first, second, third and fourth axle assemblies, respectively;
   a first electrically powered remotely controllable propulsion system including an electric propulsion motor connected to first and second axles in the first and second axle assemblies, respectively;
   a telescoping center post pivotally attached to the chassis for supporting a camera crane; and
   a hydraulic power system including an electric pump motor driving a hydraulic pump to charge an accumulator, with the hydraulic system connected to the steering hydraulic actuator, and also connected to a hydraulic center post actuator driving telescoping movement of the center post.

6. The mobile base of claim 5 with the second steering system having a handle for manually steering the third and fourth wheels.

7. The mobile base of claim 5 further including a hand controller wirelessly linked to an electronic controller on the mobile base, with the electronic controller controlling operation of the first powered remotely controllable steering system for steering the mobile base and also controlling the first electrically powered remotely controllable propulsion system to control propulsion of the mobile base.

8. The mobile base of claim 5 further including a first, second, third and fourth levelling actuators each having an upper end pivotally attached to the center post and each having a lower end pivotally attached, respectively, adjacent to first, second, third and fourth corners of the chassis.

9. The mobile base of claim 5 further comprising a second electrically powered remotely controllable propulsion system including a second electric propulsion motor connected to the third and fourth axles, respectively.

10. The mobile base of claim 9 wherein the second electric propulsion motor is connected to the third and fourth axles through a gear reduction unit.

11. The mobile base of claim 5 further including a first, second, third and fourth levelling actuators each having an upper end pivotally attached to the center post and each having a lower end pivotally attached, respectively, adjacent to first, second, third and fourth corners of the chassis.

12. A camera crane mobile base comprising:
a chassis:
a first powered remotely controllable steering system including first and second axle assemblies at a first end of the chassis;
a second steering system including third and fourth axle assemblies at a second end of the chassis;
first, second, third and fourth wheels rotatably attached onto the first, second, third and fourth axle assemblies, respectively;
a first electrically powered remotely controllable propulsion system including an electric propulsion motor connected to first and second axles in the first and second axle assemblies, respectively;
a telescoping center post pivotally attached to the chassis for supporting a camera crane; and
a second electrically powered remotely controllable propulsion system including a second electric propulsion motor connected to the third and fourth axles through a gear reduction unit.

13. The mobile base of claim 12 with the first powered remotely controllable steering system includes a steering compensator pivotally attached to the chassis, and a linear actuator having a first end pivotably attached to the steering compensator, and a second end attached to the chassis.

14. The mobile base of claim 13 wherein the linear actuator is a hydraulic actuator, further including a hydraulic power system including an electric pump motor driving a hydraulic pump to charge an accumulator, with the hydraulic power_system connected to the hydraulic actuator.

15. The mobile base of claim 12 further including a hand controller wirelessly linked to an electronic controller on the mobile base, with the electronic controller controlling operation of the first powered remotely controllable steering system for steering the mobile base and also controlling the first electrically powered remotely controllable propulsion system to control propulsion of the mobile base.

* * * * *